(12) United States Patent
Kim et al.

(10) Patent No.: US 6,931,187 B2
(45) Date of Patent: Aug. 16, 2005

(54) MODE-FILTERING AND MODE-SELECTING METHOD IN MULTI-MODE WAVEGUIDE, AND WAVEGUIDE AMPLIFIER, SEMICONDUCTOR LASER, AND VCSEL USING THE METHOD

(75) Inventors: Duck Young Kim, Kwangji (KR); Yong Woo Park, Seoul (KR); Nak Hyun Sung, Gongju (KR); Young Choon Yook, Jeonju (KR)

(73) Assignee: Kwangju Institute of Science and Technology, Gwangju (KR)

( * ) Notice: Subject to any disclaimer, the term of this patent is extended or adjusted under 35 U.S.C. 154(b) by 35 days.

(21) Appl. No.: 10/317,380

(22) Filed: Dec. 11, 2002

(65) Prior Publication Data

US 2004/0114893 A1 Jun. 17, 2004

(51) Int. Cl.[7] .................................................. G02B 6/16
(52) U.S. Cl. .......................... 385/124; 385/126; 385/37
(58) Field of Search ...................... 385/37, 50, 123–126

(56) References Cited

U.S. PATENT DOCUMENTS 6,625,182 B1 * 9/2003 Kuksenkov et al. .......... 372/19

2003/0072525 A1 * 4/2003 Sjodin et al. ................. 385/31
2003/0118289 A1 * 6/2003 Watts et al. ................... 385/50

* cited by examiner

Primary Examiner—Frank G. Font
Assistant Examiner—Eric Wong
(74) Attorney, Agent, or Firm—Martine Penilla & Gencarella, LLP

(57) ABSTRACT

Disclosed is a mode-filtering and mode-selecting method in a multi-mode waveguide, and a waveguide amplifier, a semiconductor laser, and a VCSEL using the method. These optical elements include a cladding region that has a periodically changed refractive-index structure, thereby obtaining a mode-filtering or mode-selecting function, which in turn allows only a single mode in the transverse direction to propagate along the waveguide.

By forming the periodic index-variation structure, the EDF, the semiconductor laser, and the VCSEL achieve a single mode operation although the cross-sectional area is much larger than that of the prior art, consequently realizing a high-performance or high-power single-mode amplifier and laser.

9 Claims, 7 Drawing Sheets

MODE-FILTERING AND MODE-SELECTING
METHOD IN MULTI-MODE WAVEGUIDE,
AND WAVEGUIDE AMPLIFIER,
SEMICONDUCTOR LASER, AND VCSEL
USING THE METHOD

BACKGROUND OF THE INVENTION

1. Field of the Invention

The present invention relates to a mode-filtering and mode-selecting method in a multi-mode waveguide, and a waveguide amplifier, a semiconductor laser, and a VCSEL (Vertical-Cavity Surface-Emitting Laser) using the method, and more particularly to an optical unit such as an EDF (Erbium-Doped Fiber), a semiconductor laser, and a VCSEL which include a waveguide having a cladding region that has a periodic index structure, thereby obtaining a mode-filtering or mode-selecting function, which in turn allows only a transverse single mode to propagate along the waveguide.

2. Description of the Related Art

Many researchers are vigorously studying manufacturing methods and the optical transmission characteristics of a photonic crystal fiber that is made by forming a cladding having a structure of periodically arranged holes in a silica glass.

It is known that such a photonic crystal fiber has a marvellous effect that is not easy to explain and distinct from the transmission characteristics of a general optical fiber.

Two main theories have been introduced to explain this effect.

The first is based on a photonic bandgap effect. The second is to use a Helmholtz equation, that is, an electromagnetic wave equation of a refractive-index structure, to calculate an effective refractive index thereof.

The first theory based on the photonic bandgap effect reasons that the lattice structure of cladding holes forms a band gap which is a range of not allowing the transmission of light having a propagation vector that satisfies the Bragg condition.

A numerical approach can be used for the second theory based on the effective refractive index, and therefore many researchers have published reports on the second theory.

According to the second theory, the holes formed in the cladding of the optical fiber function to lower the average refractive index of the cladding to less than the refractive index of the silica.

Therefore, the incident light experiences a relatively lower refractive index in the core having no hole, thereby allowing propagation of the incident light.

SUMMARY OF THE INVENTION

Therefore, the present invention has been made in view of the above problems, and it is an object of the present invention to provide a mode-filtering method and a mode-selecting method wherein a periodic index-variation structure in the cladding portion is formed to achieve a mode-filtering or mode-selecting effect, thereby allowing only single-mode of transverse to propagate in the waveguide.

It is another object of the present invention to provide an EDF, a semiconductor laser, and a VCSEL wherein a periodic index-variation structure is formed in a cladding portion thereof to achieve such a mode-filtering or mode-selecting effect, allowing a single mode operation although the cross-sectional waveguide area is very large, consequently realizing a high-performance or high-power single-mode amplifier and laser.

In accordance with the present invention, the objects and other objects can be accomplished by the provision of a mode-filtering method for a multi-mode waveguide, wherein a multi-mode waveguide includes a core and a cladding, and the cladding has a periodic index structure for increasing reflectivity of the cladding at only a specific transverse mode and for decreasing reflectivity of the cladding at the remaining multiple modes, thereby allowing only the specific mode to propagate along the waveguide.

In accordance with another aspect of the present invention, there is provided a mode-selecting method, wherein a multi-mode waveguide includes a core and a cladding, and a cross section of the waveguide has a periodic index-change structure to allow only a specific mode of multiple modes to propagate along the waveguide, thereby selecting the specific mode as a desired mode and removing the remaining modes as undesired modes.

In accordance with yet another aspect of the present invention, there is provided a VCSEL using a mode-filtering function in a multi-mode waveguide, the VCSEL comprising:

a multi-mode waveguide including a core and a cladding,
the core having a relatively large size,
the cladding having a refractive index structure that allows only single mode to have high reflectivity of the cladding, thereby enabling only the single mode to propagate in the waveguide and also allowing increase of the mode field size of the single mode.

The present invention uses the combination of the effective index theory and the band gap theory. That is, according to the effective index theory, only one mode having a transverse propagation vector satisfying the Bragg condition in a periodic index structure of the cladding can exist among multiple modes being able to propagate in the waveguide. According to a mode-filtering or mode-selection rule based on such an effective index theory, only a specific mode can be selected by forming a periodic index structure in the cladding in a waveguide generally considered as a multi-mode waveguide. As mentioned above, the cladding has a photonic lattice pattern for achieving a mode-filtering effect, and utilizing the mode-filtering effect allows a special waveguide, an optical fiber, and an optical unit to have various important features.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
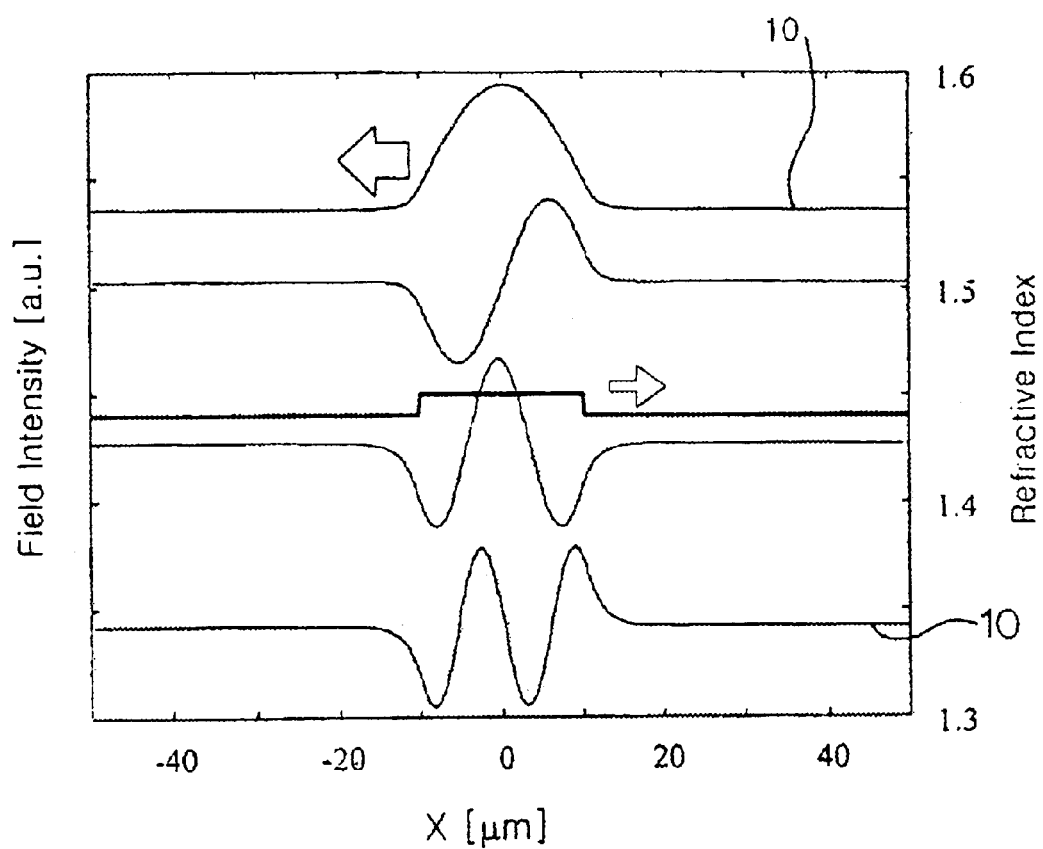
FIG. 1 is a view illustrating multiple modes in a step index waveguide that can propagate along the waveguide in a one-dimensional space according to an effective index rule.

Hereinafter, the present invention is described in detail referring to the drawings.

FIG. 1 is a view illustrating multiple modes 10 that can propagate in a one-dimensional step index waveguide according to the effective index effect.

Figure 2:
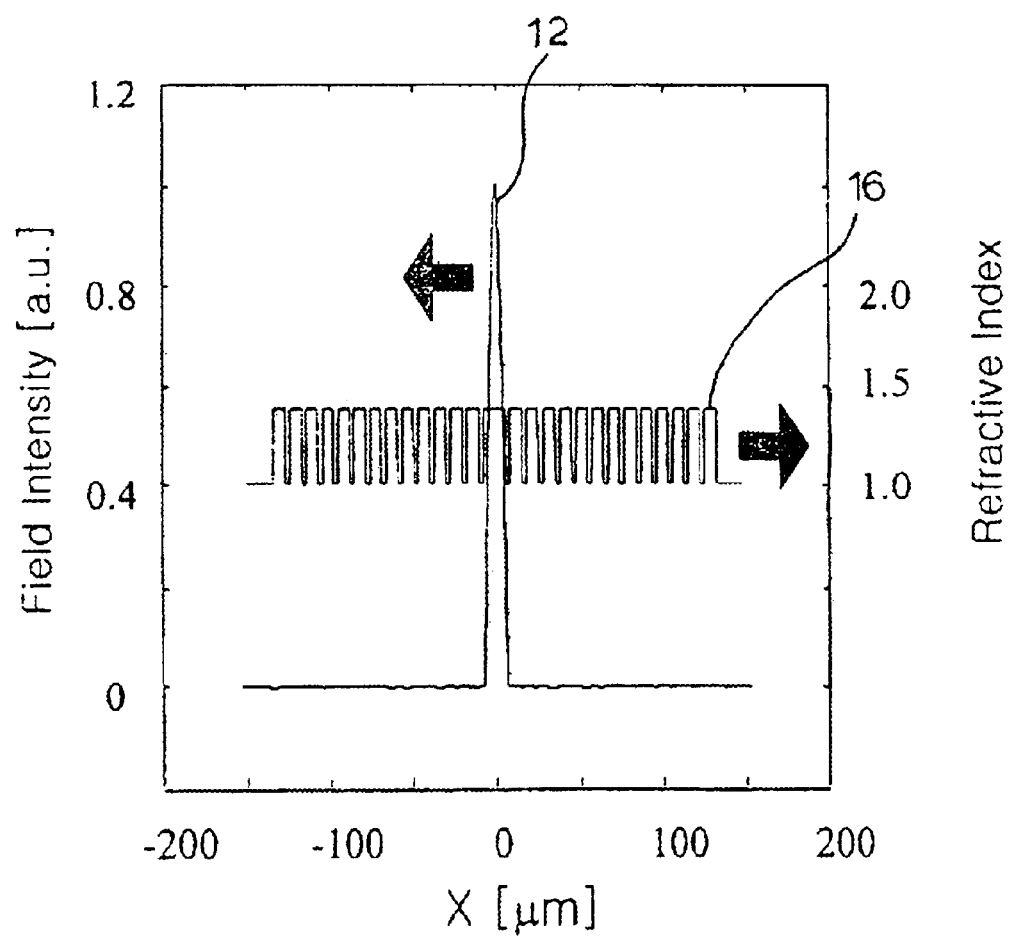
FIG. 2 is a view showing a fundamental mode of the multiple modes according to the present invention.

FIG. 2 is a view showing a single mode selected from the multiple modes that can propagate in the one-dimensional waveguide, according to the effective index theory of the present invention.

That is, FIG. 2 shows a fundamental mode 12 having the largest effective refractive index among the multiple modes that can propagate in the one-dimensional waveguide according to the effective index effect, when the cladding portion is formed to have a periodic index structure 16.

Generally, the solutions of unknown effective refractive indices corresponding to various multiple modes 10 can be obtained by solving a Helmholtz equation, an electromagnetic wave equation, for a waveguide having a photonic-lattice index structure.

The transverse propagation vector of the solutions can be obtained by the following equation 1.

$$K_T^2 = n_1^2 k_0^2 - n_{eff}^2 k_0^2 \quad \text{[Equation 1]}$$

Here, $n_{eff}$ denotes the effective refractive index of a mode in the waveguide.

The relationship between the transverse propagation vector and the transverse wavelength is given by the following equation 2.

$$\lambda_T = \frac{2\pi}{K_T} \quad \text{[Equation 2]}$$

The transverse wavelength is largest at the fundamental mode 12 and becomes gradually shorter as the mode becomes higher in order].

The following table 1 shows the calculated refractive indices for each mode in the order of descending refractive indices (largest first) in the case where a one-dimensional waveguide of photonic lattice structure has, as shown in FIG. 2, a periodic index structure 16 that includes a 14 $\mu$m-diameter enlarged core and a cladding of 10 $\mu$m-periodic structure where 3 $\mu$m-diameter air layers and 7 $\mu$m-width silica portions are alternately arranged.

TABLE 1

| $n_{eff}$ | $\lambda_T$ |
| --- | --- |
| 1.4491 | 29.3656 |
| 1.4469 | 15.8286 |
| 1.4469 | 15.8286 |
| 1.4469 | 15.8286 |
| 1.4469 | 15.8286 |
| 1.4469 | 15.8286 |
| 1.4469 | 15.8286 |
| 1.4469 | 15.8286 |
| 1.4469 | 15.8286 |

TABLE 1-continued

| $n_{eff}$ | $\lambda_T$ |
| --- | --- |
| 1.4468 | 15.5796 |
| 1.4468 | 15.5796 |
| 1.4466 | 15.1150 |
| 1.4466 | 15.1150 |
| 1.4466 | 15.1150 |
| 1.4466 | 15.1150 |
| 1.4466 | 15.1150 |
| 1.4466 | 15.1150 |
| 1.4466 | 15.1150 |
| 1.4466 | 15.1150 |
| 1.4466 | 15.1150 |
| 1.4466 | 15.1150 |
| 1.4466 | 15.1150 |
| 1.4466 | 15.1150 |
| 1.4466 | 15.1150 |

As shown in this table, when the transverse wavelength is calculated for each mode using the equation 2, the calculated result is around 29 $\mu$m only in the fundamental mode, and is around 15 $\mu$m in all the remaining modes.

Figure 3:
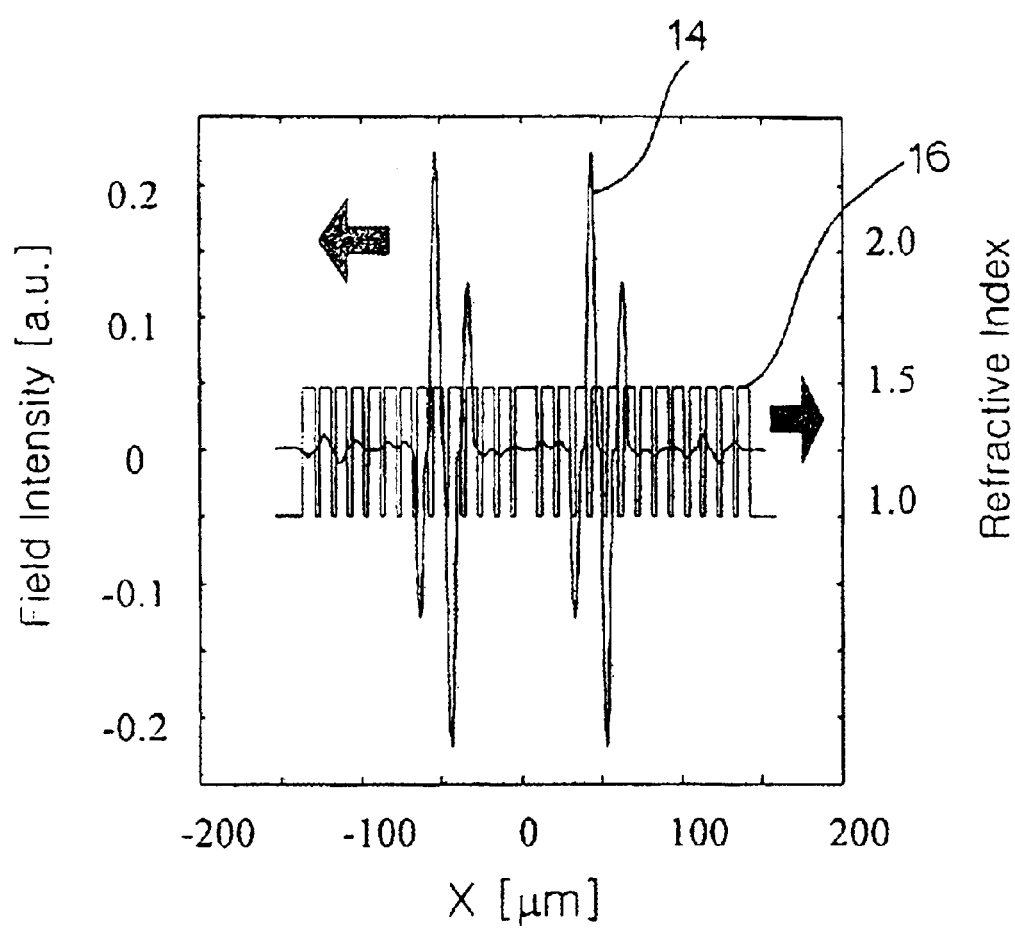
FIG. 3 is a view showing a first excited mode of the multiple modes according to the present invention.

FIG. 3 is a view showing a first excited mode 14 having the second largest effective refractive index among the multiple modes that can propagate in the one-dimensional waveguide according to the effective index effect, when the cladding portion is formed to have a periodic index structure 16.

Figure 4:
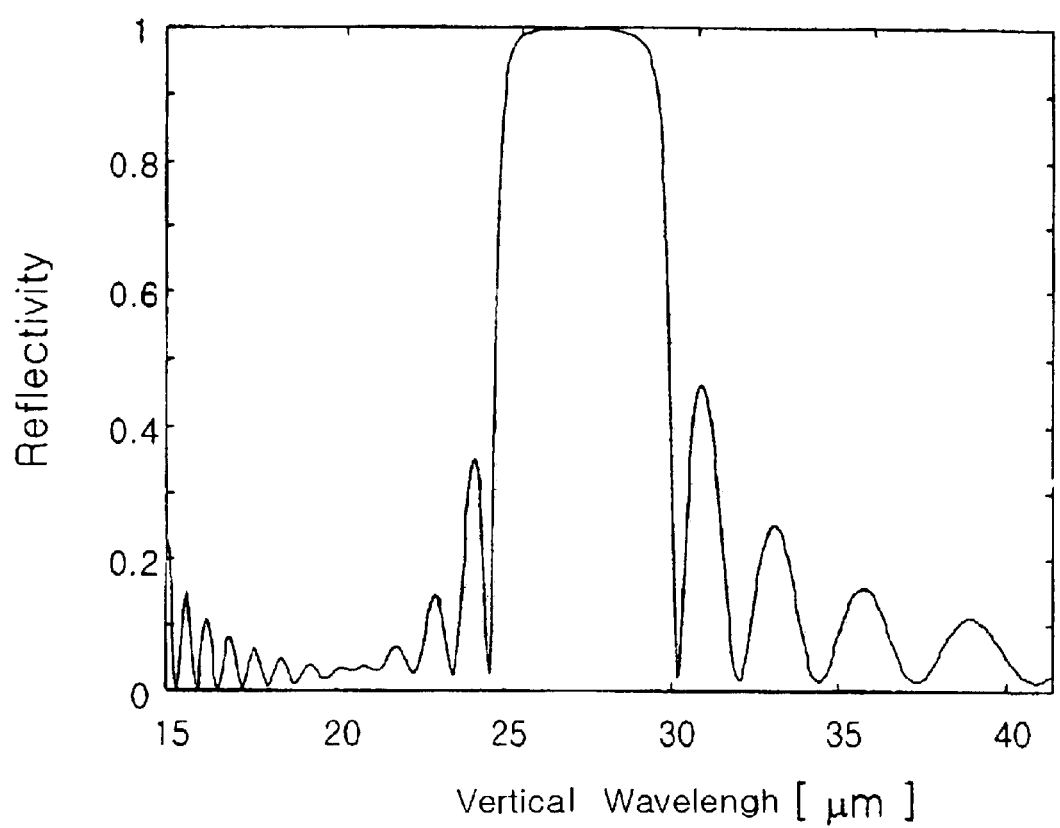
FIG. 4 is a view showing the reflectivity of a periodic index structure with respect to the transverse wavelength according to the present invention.

FIG. 4 is a graph showing the reflectivity of the periodic index structure with respect to the transverse wavelength.

That is, FIG. 4 shows the reflectivity with respect to the transverse wavelength of waves incident on the cladding from the core, in the case where the cladding has the periodic index structure 16 as shown in FIGS. 2 and 3.

As shown in FIG. 4, the reflectivity is nearly 100% only at the transverse wavelength in the range of 25 $\mu$m to 30 $\mu$m.

Accordingly, the remaining higher-order modes have very low reflectivity of the cladding having the periodic index structure 16, thereby allowing the light of the remaining higher-order modes to leak to the cladding.

Therefore, due to low reflectivity of the cladding, the higher-order mode as shown in FIG. 3 fails to propagate in the longitudinal direction of the waveguide, but leaks to the cladding. On the contrary, due to reflectivity of nearly 100%, the fundamental mode 12 shown in FIG. 2 can propagate in the longitudinal direction of the waveguide.

That is, FIG. 2 illustrates that, because the cladding having the periodic index structure 16 is formed in the multi-mode waveguide with the enlarged core, only the fundamental mode 12 has a high reflectivity of the cladding to be enabled to propagate in the waveguide, thereby allowing the increase of the mode field size of the single mode.

Thus, a waveguide of allowing only a specific mode to propagate therein can be realized by replacing the cladding portion of the waveguide with a photonic crystalline structure, and by utilizing both the period and the variation of refractive index.

Such a principle seems similar to that of a semiconductor laser such as a DFB (Distributed FeedBack) laser or a DBR (Distributed Bragg Reflection) laser in which a longitudinal-periodic index structure is formed to function as a mode filter to allow only one mode of longitudinal multiple modes, but, differently from the semiconductor laser, the present invention performs the mode-filtering for transverse modes, not for longitudinal modes.

Figure 5:
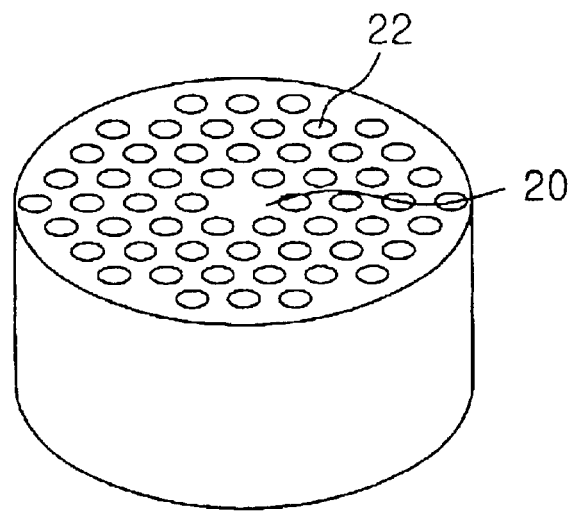
FIG. 5 is a view showing an EDF as a first application of the present invention.

FIG. 5 is a view showing an EDF (Er-Doped Fiber) employing the periodic index-change structure having the mode-filtering or mode-selecting function.

An Er-doped core 20 of the EDF has a diameter in the range from 20 μm to 30 μm, and a periodic index-change region 22 is formed around the core 20, so that only a fundamental transverse mode of multiple modes has a high reflectivity and can propagate in the EDF.

Thus, the EDF operates as a single mode EDF, and the size of the Er core 20 is very large, reducing the intensity of light in the EDF, so that the EDF can be used for a high-power amplifier.

Figure 6:
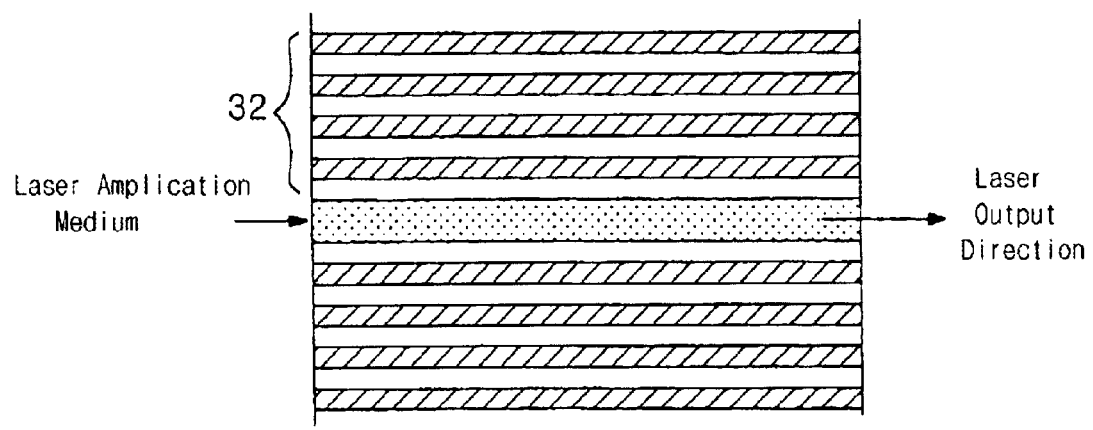
FIG. 6 is a view showing a semiconductor laser as a second application of the present invention.

FIG. 6 is a view showing a semiconductor laser employing the periodic index-change structure having the mode-filtering or mode-selecting function.

An excessive intensity of light in the laser gain material of the semiconductor laser has a bad influence on the lifetime and the light-emitting properties of the semiconductor laser.

Generally, it is necessary to enlarge the cross-sectional area of the waveguide of the semiconductor laser in order to increase the output laser-power. But, as the cross-sectional area is enlarged, the waveguide becomes a multi-mode waveguide.

Also in the case where the cross-sectional area is large, the waveguide can operate as a single-mode waveguide by forming periodic layers in the cladding portion 32 of the waveguide so as to elevate the reflectivity of only a fundamental transverse mode and to obtain a mode-filtering effect.

That is, FIG. 6 illustrates a semiconductor laser in which the cross-sectional area of the laser medium through which light passes is enlarged, and the lower and upper portions of the cladding 32 of the semiconductor laser have a periodic index structure, thereby obtaining a large-size mode field.

It is also possible to form an additional periodic index structure in the left and right portions of the cladding 32 of the semiconductor laser, thereby further increasing the size of mode field.

Figure 7:
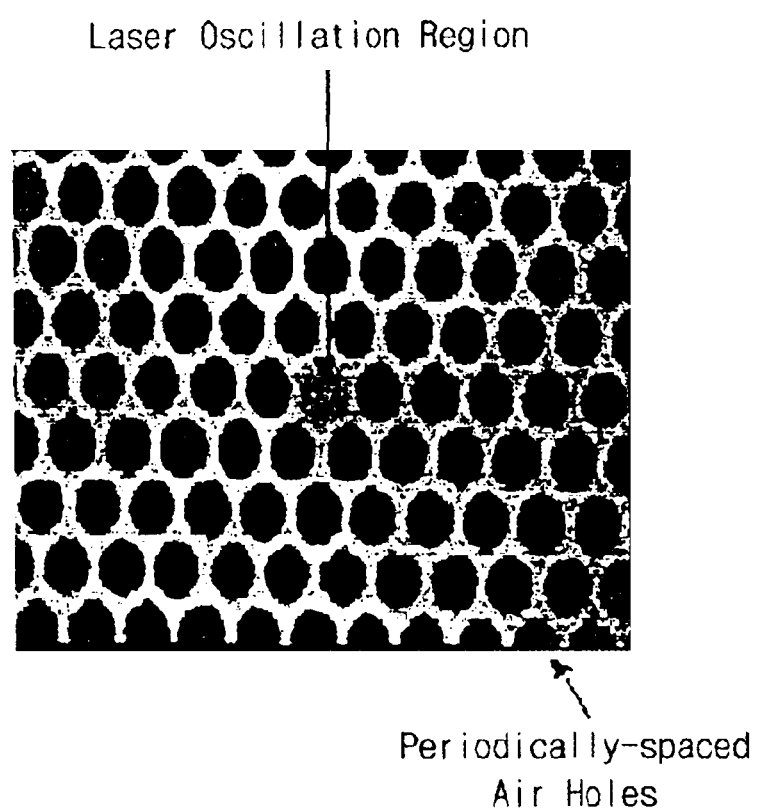
FIG. 7 is a view showing a VDSEL as a third application of the present invention.

FIG. 7 is a view showing a VCSEL (Vertical-Cavity Surface-Emitting Laser) around which the periodic index-change structure is formed for achieving the mode-filtering or mode-selecting function.

A periodic index-change structure is formed around the VCSEL so that lights exiting the surface of the VCSEL form a single mode, thereby achieving a mode-filtering or mode-selecting effect, and the area of the light-exiting portion is also enlarged thanks to the mode-filtering or mode-selecting effect, thereby increasing the laser power output.

That is, although the area of the light-exiting portion (i.e. the size of the laser oscillation-region) is enlarged up to about several tens of μm, thereby achieving a higher output laser than the prior-art VCSEL, only the fundamental mode of the multiple modes can be resonated by forming periodically-spaced air holes around the VCSEL for achieving a periodic index-change.

Figure 8A:
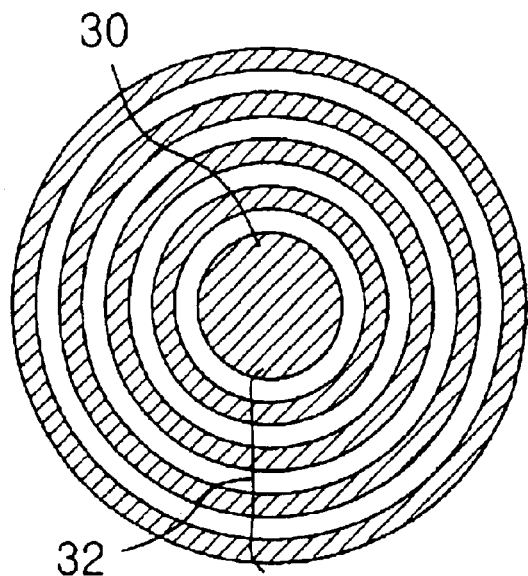
FIGS. 8a and 8b are exemplary views showing periodic index-change structures as embodiments of the present invention.

FIG. 8a is a view showing a waveguide having a ring-shaped periodic index structure. This waveguide includes a core 30 and a cladding 32 formed around the core 30. The cladding 32 includes ring-shaped layers of different refractive materials, thereby achieving the periodic index variation.

Figure 8B:
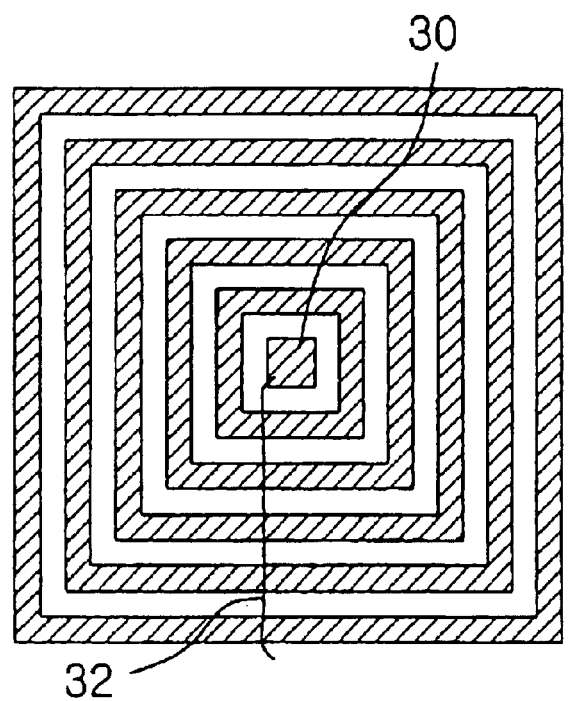

FIG. 8b is a view showing a waveguide having a rectangular-shaped index structure. This waveguide includes a core 30 and a cladding 32 formed around the core 30. The cladding 32 includes rectangular-shaped layers of different refractive materials, thereby achieving the periodic index variation.

As apparent from the above description, the present invention has the following advantages.

Firstly, a periodic index-variation structure is formed in the cladding portion, thereby achieving a mode-filtering or mode-selecting effect to allow only single-mode of transverse to propagate in the waveguide.

In addition, a periodic index-variation structure is formed in the cladding portion of an EDF, a semiconductor laser, and a VCSEL to achieve such a mode-filtering or mode-selecting effect, and thereby the single-mode operation is possible although the cross-sectional waveguide area is very large, consequently realizing a high-performance or high-power single-mode amplifier and laser.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multi-mode waveguide using mode-filtering, wherein a multi-mode waveguide includes a core and a cladding, and uses spatial filtering through a photonic bandgap effect, and the cladding has a periodic index structure for increasing reflectivity of the cladding at only a specific transverse mode and for decreasing reflectivity of the cladding at remaining multiple modes, thereby allowing only the specific mode to propagate along the waveguide.

2. The multi-mode waveguide using mode-filtering as set forth in claim 1, wherein the size of the core is enlarged, and the reflectivity of the periodic index structure is high at only a fundamental mode, thereby allowing only the fundamental mode to propagate along the waveguide.

3. The multi-mode waveguide using mode-filtering as set forth in claim 1, wherein the cladding includes one of ring-shaped layers and rectangular-shaped layers of different refractive materials, thereby achieving a periodic index variation.

4. A multi-mode waveguide using mode-filtering, wherein a multi-mode waveguide includes a core and a cladding, and a cross section of the waveguide has a periodic index-change structure to allow only a specific mode of multiple modes to propagate along the waveguide, and uses spatial filtering through a photonic bandgap effect, thereby selecting the specific mode as a desired mode and removing remaining modes as undesired modes.

5. A waveguide amplifier using a mode-filtering function in a multi-mode waveguide, the waveguide amplifier comprising:
   a multi-mode waveguide including a core and a cladding,
   the core having a relatively large size,
   the cladding having a refractive index structure that allows only a single mode to have high reflectivity of the cladding, and the multi-mode waveguide using spatial filtering through a photonic band gap effect, thereby enabling only the single mode to propagate in the waveguide and also allowing increase of a mode field size of the single mode.

6. A semiconductor laser using a mode-filtering function in a multi-mode waveguide, the semiconductor laser comprising:
   a multi-mode waveguide including a core and a cladding,
   the core having a relatively large size,
   the cladding having a refractive index structure that allows only a single mode to have high reflectivity of the cladding, and the multi-mode waveguide using spatial filtering through a photonic band gap effect, thereby enabling only the single mode to propagate in the waveguide, and also allowing increase of both a mode field size of the single mode and a cross sectional size of a laser medium of the semiconductor laser.

7. The semiconductor laser as set forth in claim 6, wherein the cladding has a periodic index structure, thereby realizing a large-sized mode field.

8. The semiconductor laser as set forth in claim 6, wherein the cladding includes left and right portions, and each of the left and right portions of the cladding has an additional periodic index structure.

9. A vertical-cavity surface-emitting laser (VCSEL) using a mode-filtering function in a multi-mode waveguide, the VCSEL comprising:

a multi-mode waveguide including a core and a cladding, the core having a relatively large size, the cladding having a refractive index structure that allows only a single mode to have high reflectivity of the cladding, and the multi-mode wave guide using spatial filtering through a photonic band gap effect, thereby enabling only the single mode to propagate in the waveguide and also allowing increase of a mode field size of the single mode.

* * * * *